United States Patent
Kuo

(10) Patent No.: US 7,262,888 B2
(45) Date of Patent: Aug. 28, 2007

(54) OPTICAL SCANNER APPARATUS WITH PINHOLE IMAGING DEVICE

(76) Inventor: Shih-Zheng Kuo, 21, Alley 8, Lane 57, Yu-Shi St., Yung-Ho, Taipei (TW)

(*) Notice: Subject to any disclaimer, the term of this patent is extended or adjusted under 35 U.S.C. 154(b) by 689 days.

(21) Appl. No.: 10/135,760

(22) Filed: May 1, 2002

(65) Prior Publication Data

US 2003/0206317 A1 Nov. 6, 2003

(51) Int. Cl.
*H04N 1/04* (2006.01)
(52) U.S. Cl. .................. 358/475; 358/483; 358/448; 250/229
(58) Field of Classification Search ............. 348/295; 358/483, 474, 400, 448, 475; 250/229, 236, 250/461.1, 559.42, 458.1; 359/212, 350, 359/196, 204, 806, 221; 235/462.12
See application file for complete search history.

(56) References Cited

U.S. PATENT DOCUMENTS 6,504,574 B1* 1/2003 Noguchi et al. ............ 348/295

* cited by examiner

*Primary Examiner*—Thomas D. Lee
*Assistant Examiner*—Heather D Gibbs
(74) *Attorney, Agent, or Firm*—Berkeley Law & Technology Group LLP

(57) ABSTRACT

A pinhole-imaging device is used as an imaging device for an optical scanner apparatus. The pinhole-imaging device replaces the conventional lens-imaging device and is placed in front of the optical sensor to receive the imaged light from the scanning object and the optical image is focused on the optical sensor. When the radius of the aperture of pinhole-imaging device is smaller or equal to the pixel of the optical sensor, the imaged light transmitted through the aperture of the pinhole-imaging device is focused on the optical sensor to form an image such that the resolution of the optical imaging can be obtained and the light dispersion effect issue can be improved.

36 Claims, 3 Drawing Sheets

OPTICAL SCANNER APPARATUS WITH PINHOLE IMAGING DEVICE

BACKGROUND OF THE INVENTION

1. Field of the Invention

The present invention generally relates to an optical scanner apparatus, and more particularly to an imaging device of an optical scanning module to prevent the light dispersion effect and obtain the better mtf (modulation transfer function).

2. Description of the Prior Art

Scanner devices, such as flatbed scanners, are well known in the art and produce machine-readable image data signals that are representative of scanned object, such as a photograph or a page of printed text. In a typical scanner application, the image data signals produced by a scanner may be used by personal computer to reproduce an image of the scanned object in a suitable display device, such as a CRT (cathode ray tube) or a print.

Flatbed scanners are widely used with computer systems for converting printed data into image signals. An optical scanning module is the most important component of the flatbed scanner. The scanning module commonly comprises a housing with an opening for receiving light transmitted from a scanning object, an optical sensor such as CCD (charge coupled device) installed inside the housing for converting the transmitted light into corresponding image signals, and a plurality of lenses for focusing the transmitted light onto the optical sensor.

A typical flatbed scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the illumination and optical systems with respect to the object.

The illumination system may include a light source (e.g., a fluorescent or incandescent lamp or an array if light emitting diodes (LEDs)). The optical system may include a lens and/or mirror assembly to focus the image of the illuminated scan line onto the surface of the detector. Alternative, a "contact image sensor" (CIS) may be used to collect and focus light from the illuminated scan region onto the detector.

The photosensitive detector used to detect the image light focused thereon by the optical system may be a charge-coupled device (CCD), although other devices may be used. A typical CCD may comprises an array of an individual cells or "pixels", each of which collects or builds-up an electrical charge in response to exposure to light. Since the quantity of the accumulated electrical charge in any given cell or pixel is related to the intensity and duration of the light exposure, a CCD may be used to detect light and dark spots on an image focused thereon.

Referring to FIG. 1A, the reference number 100 is scanning an object; reference number 102 is reflected light which is illuminated the document to form a reflected light; reference number 104 is a conventional lens-imaging device of an optical scanning module; and reference number 106 is an optical sensor. In conventional scanning method of an optical scanner apparatus, a reflected light 102 from the scanning object 100 is transmitted to the lens-imaging device 104 to the optical sensor 106, and an optical imaging (not shown in FIG. 1A) is focused on the optical sensor 106. In the conventional optical scanning module, the imaging data is focused on the optical sensor 106 which is according to the theorem of the formation of image, the reflected light 102 is transmitted from the scanning object 100 to the lens-imaging device 104, the imaging data is communicated to the optical sensor 106. Then, the imaging data is treated and output to the output device, such as a print or monitor (not shown in FIG. 1A).

The response distribution curve diagram of the FIG. 1B is formed that according to the FIG. 1A. According to the theorem of the formation of image, the reflected light point 102A, 102B, and 102C of the scanning object 100 and transmitted to the lens-imaging device 104 to the optical sensor 106 to form a response distribution curve diagram 200. Due to the light dispersion effect, the two ends 202A and 202B of the response distribution curve of the response distribution curve diagram 200 are lower than the response distribution curve that is formed from the light 102C (straight light) and other stream of light (not shown in FIG. 1B) between the ends 202A and 202B. Furthermore, due to the light dispersion effect, the imaging data cannot focus completely on a point such that the resolution of the imaging data on the two ends 202A and 202B is bad. Therefore, the resolution of the scanning object will be degraded.

In addition, the optical scanner apparatus with a lens-imaging device as a formation of image is used for scanning the scanning object 100, the optical image of the scanning object 100 is focused on the optical sensor 106 and converted the analogy signal into digital signal by ADC (analogy digital convert system). Therefore, in order to obtain a higher resolution, the number of pixel for CCD 106 must be increase. However, the cost of the CCD 106 is proportional to the square of the number of pixels. When the higher resolution is required that will cause the cost of CCD 106 is a great part of the production of the optical scanner. Furthermore, the lens-imaging device exhibits a plane to scan the scanning object 100, and the MTF (modulation transfer function) is poor when the optical sensor 106 is diverged from the plane of the lens-imaging device 104.

SUMMARY OF THE INVENTION

It is an object of this invention to provide an imaging device to replace the conventional lens device to economize the cost.

It is a further object of this invention to provide an imaging device to improve the light dispersion effect.

It is yet an object of this invention to increase the exposure to enhance the ratio of s/n (signal/noise).

According to the abovementioned objects, the present invention provides an imaging device to replace the conventional lens-imaging device in an optical scanning module of an optical scanner apparatus. The imaging device such as a pinhole-imaging device is used to replace the conventional lens-imaging device in an optical scanning module to receive the illuminant, which is transmitted from the scanning object to the pinhole-imaging device and into the optical sensor such as a CCD (charge coupled device) to form an optical image focused on the CCD. The size of the aperture of the pinhole-imaging device can be equal to or smaller than the pixel of the CCD such that the illuminant only illuminates through the apertures of the pinhole-imaging device to the CCD to reduce the light dispersion effect.

Furthermore, in order to reduce the s/n (signal/noise) ratio, the scanning exposure is increased to obtain better image qualities.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Some sample embodiments of the invention will now be described in greater detail. Nevertheless, it should be recognized that the present invention can be practiced in a wide range of other embodiments besides those explicitly described, and the scope of the present invention is expressly not limited except as specified in the accompanying claims.

A conventional optical scanner apparatus with a lens-imaging device scans a scanning object to form an optical image which is focused on the optical sensor. The conventional optical scanner apparatus with lens-imaging device for scanning object, due to the light dispersion effect such that the imaged light cannot focus completely on the optical sensor, may cause poor resolution when the imaged light is transmitted through the lens-imaging device to the optical sensor. Therefore, the present invention provides a pinhole-imaging device used to replace the conventional lens-imaging device to improve the resolution of the optical imaging and light dispersion effect issue, and the MTF (modulation transfer function) also can be improved.

Figure 2A:
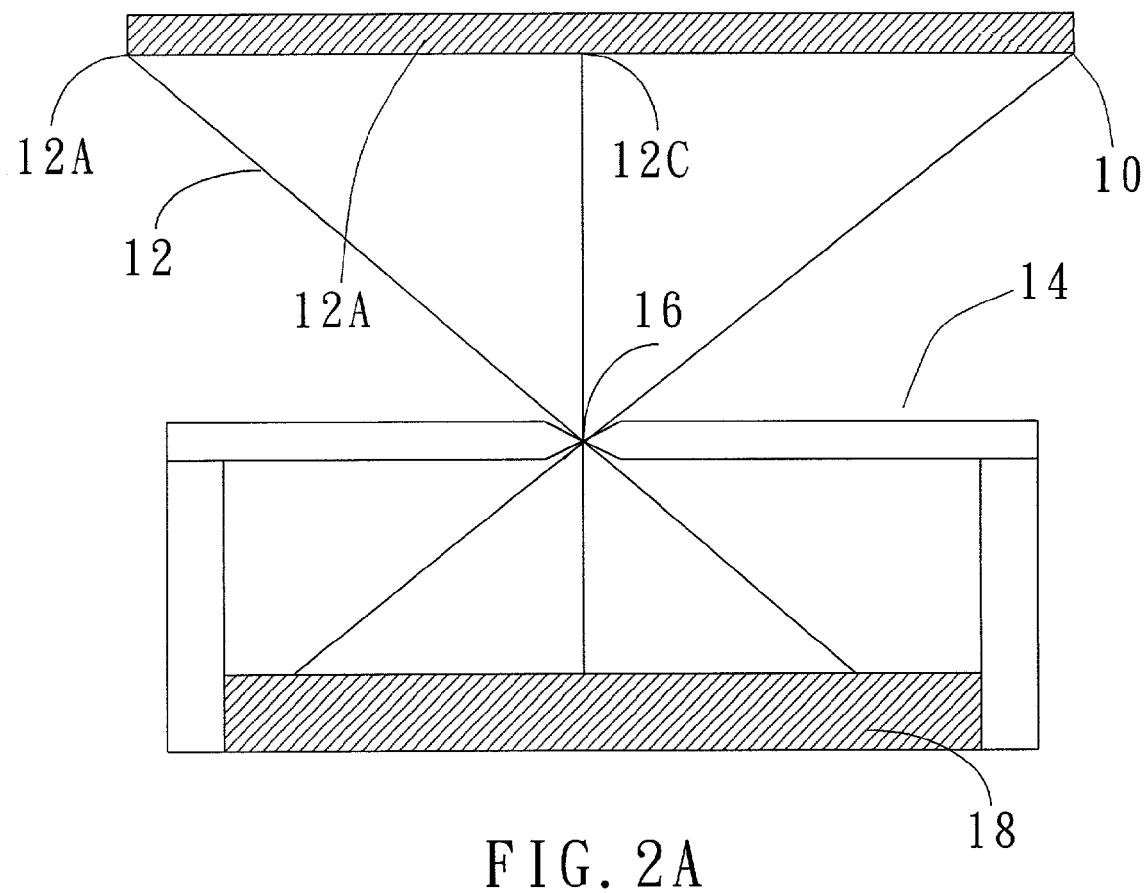
FIG. 2A is a schematic representation showing the macroscopic optical scanner apparatus with a pinhole-imaging device in accordance with a device disclosed herein.

Referring to FIG. 2A, which is a macroscopic representation of an optical scanner apparatus with a pinhole-imaging device according to one embodiment of the present invention. The reference number 10 is a scanning object, number reference 12 is imaged light, such as reflected light or transparent light from the illuminant which illuminates the scanning object 10, reference number 12A and 12B represent the light point on the two ends of the scanning object 10, and the reference number 14 is a pinhole-imaging device that is used to receive the imaged light 12 from the scanning object 10 and transmitted to the aperture 16 of the pinhole-imaging device 14 to the optical sensor 18, wherein the size of the aperture 16 of the pinhole-imaging device 14 is smaller or equal to the size of the pixel of the optical sensor 18 to focus the optical imaging on the optical sensor 18, wherein, the optical sensor 18 can be a CCD (charge coupled device) or a CIS (contact image sensor). In the present invention, the optical sensor 18 is CCD.

Figure 1A:
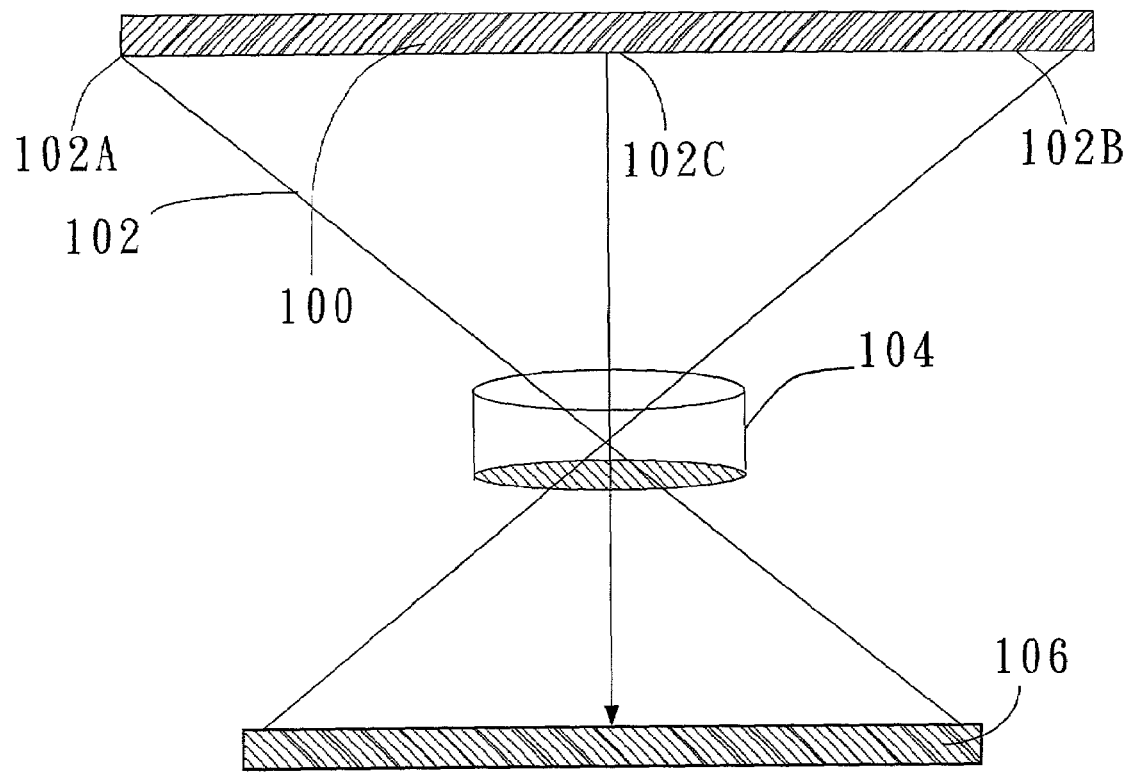
FIG. 1A is a schematic representation showing the conventional optical scanner apparatus with lens-imaging device.
Figure 1B:
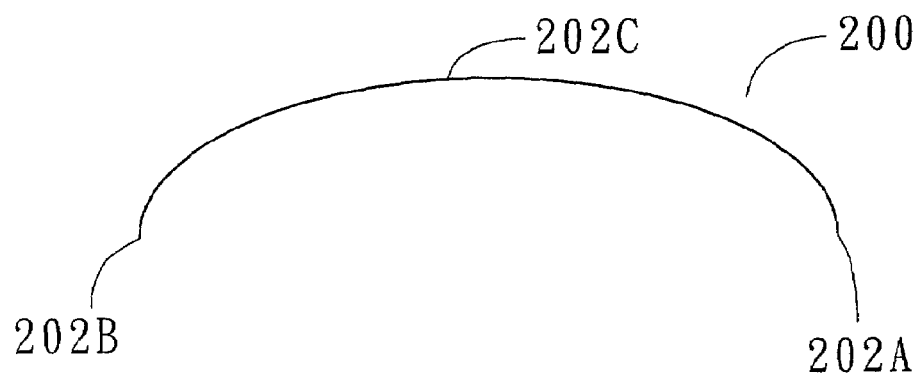
FIG. 1B is a schematic representation showing the response distribution curve diagram for an illuminant transmitted to the conventional lens-imaging device.
Figure 2B:
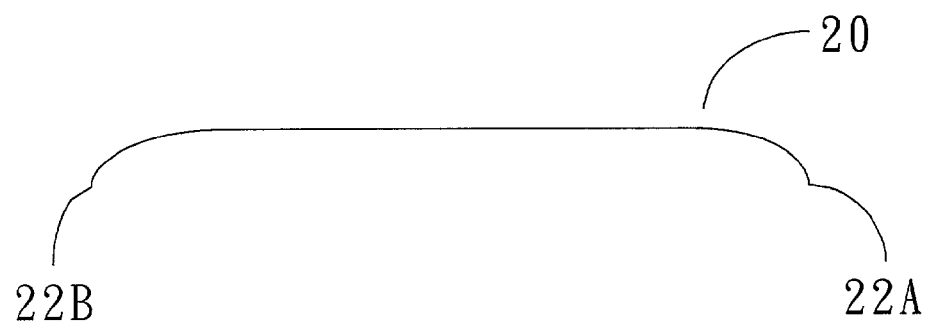
FIG. 2B is a schematic representation showing the response distribution curve diagram for illuminant transmitted to the pinhole-imaging device in accordance with a device disclosed herein.

Referring to FIG. 2B, which represents a response distribution curve diagram 20 that is formed from the imaged light 12 transmitted through the aperture 16 of the pinhole-imaging device 14 to the CCD 18. The imaged light 12 is transmitted to the aperture 16 of the pinhole-imaging device 14, focusing the optical imaging completely on the CCD 18 such that the light dispersion effect issue can be improved (FIG. 2B is compared with the FIG. 1B, the response distribution curve of FIG. 2B is superior to FIG. 1B). Therefore, the resolution can be enhanced when the imaging data is converted into a digital signal, and the quality of the optical imaging that is output to the monitor or printer also can be improved.

Figure 3A:
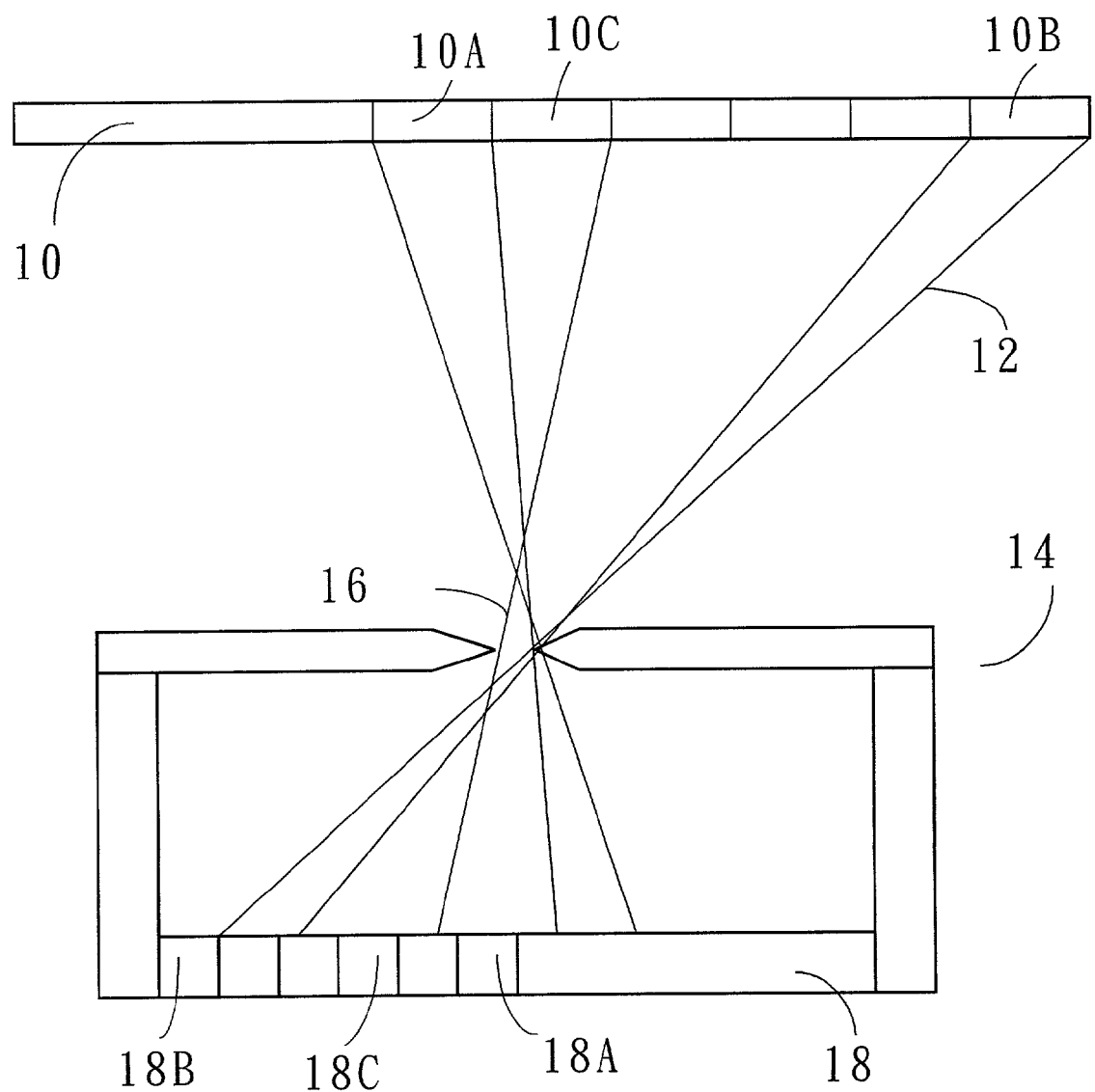
FIG. 3A is a macroscopic schematic representation showing the optical scanner apparatus with a pinhole-imaging device in accordance with a device disclosed herein.

The FIG. 3A is an enlarged diagram for a pinhole-imaging device 16 to illustrate the imaged light 12 that is transmitted to the pinhole-imaging device 14 to form an optical imaging on the CCD 18. In the one embodiment of the present invention, a scanning object 10 is illuminated by a stream of light such that the scanning object 10 can be divided many sections, such as reference number 10A, 10B, and 10C (shown in FIG. 3). The stream of light illuminates each section 10A, 10B, and 10C and the imaged light 12 is transmitted from the scanning object 10 through the aperture 16 of the pinhole-imaging device 14 to the CCD 18. Then, the optical imaging is focused on the CCD 18. Similarly, the CCD 18 can be divided into many sections, such as 18A, 18B, and 18C that correspond to each section of the scanning object 10. The sections 18A, 18B, and 18C show that the imaged light 12 is transmitted from the scanning object 10 to the pinhole-imaging device 14, and that the optical imaging is focused on the sections of the CCD 18. The imaged light 12 is transmitted from the scanning object 10 through the pinhole-imaging device 14 such that the pinhole-imaging device 14 can focus the optical imaging of the scanning object 10 completely on the CCD 18. According to the aforementioned, each section of the scanning object 10 can be focused completely on the CCD 18 such that the resolution of the optical imaging can be improved, and the quality of the optical imaging also can be enhanced. Therefore, the light dispersion effect issue can be reduced and the MTF (modulation transfer function) can be improved.

Figure 3B:
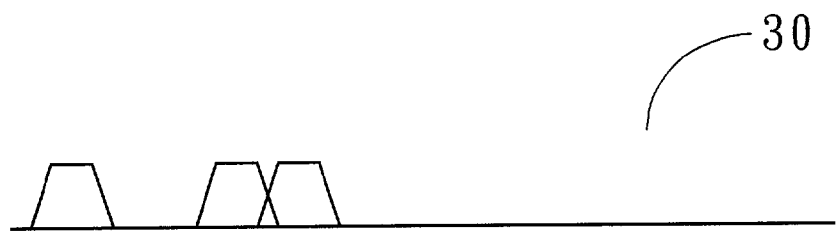
FIG. 3B is a schematic representation showing the signal profile for reflected light transmitted to the pinhole-imaging device in accordance with a device disclosed herein.

Referring to FIG. 3B, the signal profile 30 is formed from the imaged light that is transmitted from the scanning object 10 to the pinhole-imaging device 16 and focused as an optical imaging on the CCD 18. According to the signal profile 30, each pixel of the CCD 18 can receive uniform illuminant from the stream of the light such that each section can respond according to a uniform signal profile. Furthermore, the brightness of the illuminant is increased to increase the s/n (signal/noise) ratio, and when the s/n ratio is increased the signal is greater than the noise such that the quality of scanning can be obtained and the MTF also can be improved. Moreover, the scanning exposure also can be increased such that the resolution of the optical imaging can be enhanced.

Then, the optical imaging is converted from an analog signal into a digital signal by an ADC (analogy digital convert system) (not shown) and communicated to the ASIC (application specific integrated circuit). By use of the variety of chip set within the ASIC, the digital signal is communicated to the host (not shown) of a personal computer (not shown) by an interface, wherein the interface can be a USB (universal serial bus), parallel port, SCSI TCP (small computer system interface transmission control protocol), or IR (infrared ray) communication. Next, the digital signal is communicated to the output device (not shown), such as monitor, printer, or PDA (personal digital assistant), to display the imaging data of the scanning object 10.

Although specific embodiments have been illustrated and described, it will be obvious to those skilled in the art that various modifications may be made without departing from what is intended to be limited solely by the appended claims.

What is claimed is:

1. An optical scanner apparatus, comprising:
a light source capable of illuminating a scanning object; and
an optical sensor capable of receiving imaged light from the scanning object through a pinhole-imaging device comprising an aperture having a radius no greater than a pixel size of the optical sensor.

2. The optical scanner apparatus according to claim 1, wherein the radius of said aperture is smaller than a pixel of said optical sensor.

3. The optical scanner apparatus according to claim 1, wherein the radius of said aperture is equal to a pixel size of said optical sensor.

4. The optical scanner apparatus according to claim 1, wherein said imaged light comprises light reflected from the scanning object.

5. The optical scanner apparatus according to claim 1, wherein said imaged light comprises light transmitted through the scanning object.

6. The optical scanner apparatus according to claim 1, wherein said optical sensor comprises a charge coupled device.

7. The optical scanner apparatus according to claim 1, further comprising an analog-digital converter capable of receiving imaging data communicated from said optical sensor and further capable of converting said imaging data into a digital signal.

8. The optical scanner apparatus according to claim 1, further comprising an application specific integrated circuit capable of receiving said digital signal and further capable of processing said digital signal.

9. An optical scanner apparatus, comprising:
a light source capable of illuminating a scanning object to form an imaged light;
a pinhole-imaging device comprising an aperture having a radius no greater than a pixel size of an optical sensor, the pinhole-imaging device capable of receiving said imaged light and further capable of focusing an optical imaging on the optical sensor;
an analog-digital converter capable of receiving imaging data communicated from said optical sensor and further capable of converting said imaging data into a digital signal; and
an application specific integrated circuit capable of receiving said digital signal and further capable of processing said digital signal.

10. The optical scanner apparatus according to claim 9, wherein the radius of said aperture is smaller than a pixel of said optical sensor.

11. The optical scanner apparatus according to claim 9, wherein the radius of said aperture is equal to a pixel size of said optical sensor.

12. The optical scanner apparatus according to claim 9, wherein said imaged light comprises light reflected from the scanning object.

13. The optical scanner apparatus according to claim 9, wherein said imaged light comprises a light transmitted through the scanning object.

14. The optical scanner apparatus according to claim 9, wherein said optical sensor comprises a charge coupled device.

15. An optical scanner apparatus comprising:
a light source capable of illuminating a scanning object to form an imaged light, wherein said scanning object is positioned on a platen of said optical scanner apparatus;
a pinhole-imaging device comprising an aperture having a radius no greater than a pixel size of a charge coupled device, said pinhole-imaging device capable of receiving said imaged light and further capable of focusing imaged light on the charge coupled device;
an analog-digital converter capable of receiving imaging data communicated from said charge coupled device and further capable of converting said imaging data into a digital signal; and
an application specific integrated circuit capable of receiving said digital signal and further capable of processing said digital signal.

16. The optical scanner apparatus according to claim 15, wherein said radius of said aperture is smaller than said pixel size of said charge coupled device.

17. The optical scanner apparatus according to claim 15, wherein said imaged light comprises light reflected from the scanning object.

18. The optical scanner apparatus according to claim 15, wherein said imaged light comprises light transmitted through the scanning object.

19. An apparatus, comprising:
a light source capable of reflecting light off of a scanning object; and
an optical sensor capable of receiving the reflected light through an imaging component comprising an aperture having a radius approximately no greater than a pixel size of the optical sensor, wherein the imaging component is capable of focusing the reflected light onto the optical sensor.

20. The apparatus of claim 19, wherein the aperture has a radius approximately equal to the pixel size of the optical sensor.

21. The apparatus of claim 19, wherein the aperture has a radius less than the pixel size of said optical sensor.

22. The apparatus of claim 19, wherein the optical sensor comprises a charge-coupled device.

23. An apparatus, comprising:
a light source capable of transmitting light through a scanning object; and
an optical sensor capable of receiving the transmitted light through an imaging component comprising an aperture having a radius no greater than a pixel size of the optical sensor, wherein the imaging component is capable of focusing the reflected light onto the optical sensor.

24. The apparatus of claim 23, wherein the aperture has a radius approximately equal to the pixel size of the optical sensor.

25. The apparatus of claim 23, wherein the aperture has a radius less than the pixel size of the optical sensor.

26. The apparatus of claim 23, wherein the optical sensor comprises a charge-coupled device.

27. An method, comprising:

illuminating a scanning object;

passing light reflected by the scanning object through an aperture having a radius approximately no greater than a pixel size of an optical sensor; and receiving the light passed through the aperture at the optical sensor.

28. The method of claim 27, wherein passing light reflected by the scanning object through the aperture comprises focusing the light reflected by the scanning object onto the optical sensor.

29. The method of claim 27, wherein receiving the light passed through the aperture comprises receiving the light at a charge-coupled device.

30. The method of claim 27, wherein passing light reflected by the scanning object through an aperture having a radius approximately no greater than a pixel size of an optical sensor comprises passing the light through an aperture having a radius approximately equal to the pixel size of the optical sensor.

31. The method of claim 27, wherein passing light reflected by the scanning object through an aperture having a radius approximately no greater than a pixel size of an optical sensor comprises passing the light through an aperture having a radius less than the pixel size of the the optical sensor.

32. An apparatus, comprising:

means for illuminating a scanning object;

means for passing light reflected by the scanning object through an aperture having a radius approximately no greater than a pixel size of an optical sensor; and means for receiving the light passed through the aperture.

33. The aperture of claim 32, wherein the means for passing light reflected by the scanning object through the aperture comprises means for focusing the light selected by the scanning object onto the optical sensor.

34. The apparatus of claim 32, wherein the means for receiving the light passed through the aperture comprises means for receiving the light at a charge-coupled device.

35. The apparatus of claim 32, wherein the means for passing light reflected by the scanning object through an aperture having a radius approximately no greater than a pixel size of an optical sensor comprises means for passing the light through an aperture having a radius approximately equal to the pixel size of the optical sensor.

36. The apparatus of claim 32, wherein the means for passing light reflected by the scanning object through an aperture having a radius approximately no greater than a pixel size of an optical sensor comprises means for passing the light through an aperture having a radius less than the pixel size of the optical sensor.

\* \* \* \* \*

UNITED STATES PATENT AND TRADEMARK OFFICE
CERTIFICATE OF CORRECTION

PATENT NO. : 7,262,888 B2
APPLICATION NO. : 10/135760
DATED : August 28, 2007
INVENTOR(S) : Kuo Shih-Zheng Page 1 of 1

It is certified that error appears in the above-identified patent and that said Letters Patent is hereby corrected as shown below:

At column 5, line 20, delete "a" and insert -- the --, therefor.

At column 5, line 20, after "pixel" insert -- size --.

At column 5, line 23, delete "a" and insert -- the --, therefor.

At column 6, line 2, after "comprises" delete "a".

At column 7, line 1, delete "An" and insert -- A --, therefor.

At column 7, line 26, before "optical" delete "the".

At column 8, line 7, delete "aperture" and insert -- apparatus --, therefor.

At column 8, line 9, delete "selected" and insert -- reflected --, therefor.

Signed and Sealed this

First Day of September, 2009

David J. Kappos
*Director of the United States Patent and Trademark Office*